United States Patent
Tsaur

(10) Patent No.: US 8,140,480 B1
(45) Date of Patent: Mar. 20, 2012

(54) OFF-HOST CATALOGING OF BACKUP INFORMATION

(75) Inventor: Ynn-Pyng "Anker" Tsaur, Oviedo, FL (US)

(73) Assignee: Symantec Corporation, Mountain View, CA (US)

( * ) Notice: Subject to any disclaimer, the term of this patent is extended or adjusted under 35 U.S.C. 154(b) by 244 days.

(21) Appl. No.: 12/415,384

(22) Filed: Mar. 31, 2009

(51) Int. Cl.
*G06F 17/30* (2006.01)

(52) U.S. Cl. .................................................. 707/648

(58) Field of Classification Search .......... 707/640–644, 707/672, 740
See application file for complete search history.

(56) References Cited

U.S. PATENT DOCUMENTS

| | | | |
|---|---|---|---|
| 6,360,330 B1 * | 3/2002 | Mutalik et al. .................. 714/4.1 |
| 6,678,809 B1 * | 1/2004 | Delaney et al. ................ 711/162 |
| 7,085,962 B1 * | 8/2006 | Hamilton et al. ................ 714/15 |
| 7,127,479 B2 | 10/2006 | Tsaur et al. .................... 707/204 |
| 7,266,655 B1 * | 9/2007 | Escabi et al. .................. 711/162 |
| 7,558,928 B1 * | 7/2009 | DeVos ............................ 711/162 |
| 7,725,428 B1 * | 5/2010 | Hawkins et al. ........ 707/999.204 |
| 2008/0104147 A1 * | 5/2008 | Schwaab et al. .............. 707/204 |

OTHER PUBLICATIONS

Oracle for SAP Technology Update, 2003, Oracle for SAP Global Technology Center, No. 12, pp. 4-8.*

* cited by examiner

*Primary Examiner* — Cheryl Lewis
*Assistant Examiner* — Scott A Waldron
(74) *Attorney, Agent, or Firm* — Campbell Stephenson LLP

(57) ABSTRACT

Various techniques for performing off-host cataloging of backup information are disclosed. One method involves initiating, subsequent to the closure of a backup window, generation of at least a portion of a catalog. The catalog identifies contents of a set of backup information received during the backup window. The generation of the portion of the catalog is performed by a backup computing device and does not involve the host computing device from which the backup information was received. Prior to completion of generation of the catalog, a request to access the catalog is received from a user. In response, information included in the catalog is dynamically displayed to the user.

17 Claims, 6 Drawing Sheets

OFF-HOST CATALOGING OF BACKUP INFORMATION

FIELD OF THE INVENTION

This invention relates to data protection and, more particularly, to performing backups of data.

DESCRIPTION OF THE RELATED ART

Many existing backup systems operate by having a media server obtaining the information to be backed up from an application server that generates and/or consumes the information. The time period in which the information is collected by the media server can be referred to as a backup window. During the backup window, the media server establishes a data and/or control communication channel to the host machine implementing the application server. The data communication channel is used to receive the information being backed up, and the control communication channel can be used to receive catalog information describing the information that is being backed up. The catalog information can be used to improve the restoration process by allowing users to see what particular information (e.g., logical objects such as emails, database objects, directories, files, and the like) is included in a particular set of backup information.

Unfortunately, the process of obtaining enough catalog information from the application server to meaningfully improve the restoration process can be quite time consuming, thus increasing the length of time in which the control communication channel needs to be established. For example, when backing up information used by applications that maintain a large number of logical objects (e.g., such as email servers that maintain large numbers of emails), the control communication channel may need to remain in place much longer than the corresponding data communication channel, which in turn lengthens the backup window. This in undesirable, since while the backup window is established, the application server's performance is likely to be significantly diminished.

In order to address this concern about the length of the backup window, some backup systems offer customers the opportunity to turn off the catalog information collection process. While this reduces the length of time that the control communication channel needs to be established (and can thus reduce the length of the overall backup window), it also causes the restoration process to be more cumbersome, since users will have very limited information, if any, about what particular items are included in a given set of backup information. For example, instead of being able to select a particular email within a set of backup information for restoration, the user may have to select the entire set of backup information for restoration, since no catalog information identifying the email was collected during the backup window.

One way to minimize the length of the backup window (at least as it affects the application server) is to replicate the application server's information to another server, and then to backup that other server's copy of the information. However, this solution increases the expense (due to the requiring duplicate servers and duplicate storage) and complexity (due to requiring replication) of the backup system. Furthermore, there will still be a backup window for the other server that provides access to the replicated information, and thus some performance impacts may remain in such systems.

SUMMARY OF THE INVENTION

Various systems and methods for performing off-host cataloging of a backup are disclosed. For example, one method involves initiating, subsequent to the closure of a backup window, generation of at least a portion of a catalog. The catalog identifies contents of a set of backup information received during the backup window. The generation of the portion of the catalog is performed by a backup computing device and does not involve the host computing device from which the backup information was received. Prior to completion of generation of the catalog, a request to access the catalog is received from a user. In response, information included in the catalog is dynamically displayed to the user.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
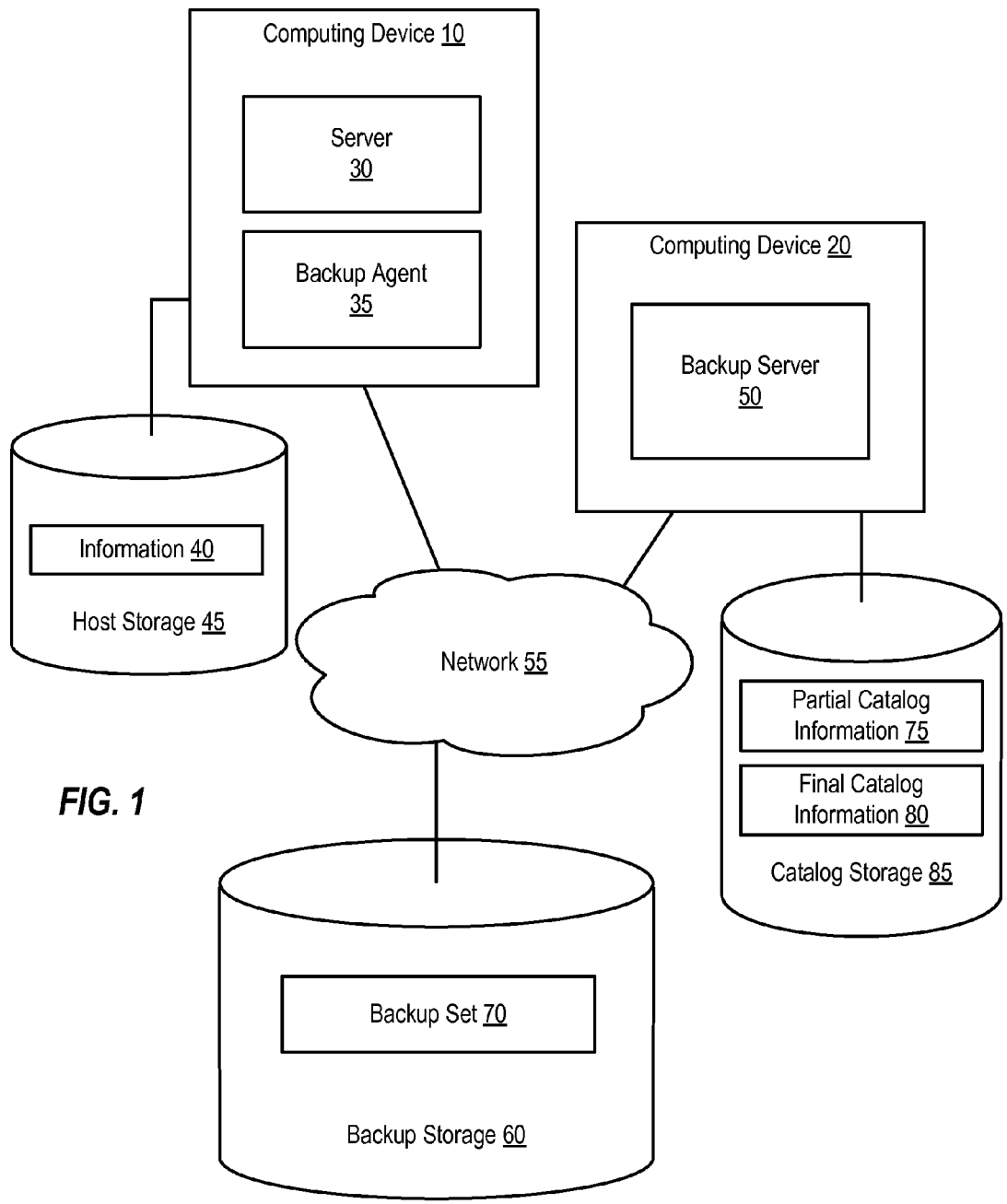
FIG. 1 is a block diagram of a system that implements off-host cataloging of backups, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a system that can perform off-host cataloging of backups. As shown, the system includes two computing devices, computing device 10 and computing device 20. Computing device 10 implements a server 30 and a backup agent 35. Computing device 20 implements a backup server 50. In one embodiment, backup agent 35 and backup server 50 are each implemented using the Backup Exec™ family of products, available from Symantec, Corp. of Cupertino, Calif.

In this example, computing device 10 and computing device 20 are coupled by a network 55. Network 55 can include one or more storage, local, and/or wide area networks. Network 55 can be implemented using various topologies, communication protocols, and physical links (e.g., wireless links, coaxial cables, and the like). In some embodiments, certain components may be directly connected, as opposed to being connected via a network. Similarly, in some embodiments, backup server 50 may be implemented on the same computing device as server 30.

Server 30 is a software application that provides one or more services to clients. The services provided by server 30 can include data access and retrieval (e.g., if server 30 is a web server, database server, or file server). Server 30 can also or alternatively implement business logic to perform various business functions. For example, server 30 can provide search engine functionality, email services (e.g., such as those provided by Microsoft™ Exchange Server, available from Microsoft Corporation of Redmond, Wash.), data collaboration and/or portal management services (e.g., as provided by SharePoint™ Server, available from Microsoft Corporation of Redmond, Wash.), directory services (e.g., as provided by Active Directory™, available from Microsoft Corporation of Redmond, Wash.), or any other desired functionality.

The information 40 maintained by server 30 is stored in application storage 45. This information 40 can be organized in a file system or database. Information 40 can include information that is provided to and/or received from clients by server 30, as well as information generated and/or consumed by server 30 in the process of managing the other information being provided to and/or received from clients. Application storage 45 is a storage device that is accessible to server 30.

Backup server 50 is configured to manage the performance of backup operations that generate a point-in-time copy (referred to as a backup) of all or some of information 40. Backup server 50 also manages the copying of data from application storage 45 to backup storage 60, which is a storage device that is accessible to backup server 50. In some embodiments, the functionality of backup server 50 can be subdivided into two servers: a master server, which handles the management tasks, and a media server, which handles the data movement tasks. In embodiments in which the backup server functionality is subdivided into different servers, the different servers can be implemented on different computing devices.

Each time that backup server 50 creates a backup of all or part of information 40, backup server 50 interacts with backup agent 35 in order to obtain a point-in-time copy of the desired portion of information 40 and to store that information as a backup set 70 on backup storage 60. Backup set 70 is thus a point-in-time copy of information 40 used by server 30. For example, if server 30 is an email server, backup set 70 can include a point-in-time copy of the database and log files used by that email server.

In some embodiments, a backup administrator can select certain portions of information 40 to be included in each backup set, such that some of information 40 is not selected (e.g., certain duplicated files can be excluded, as can temporary files). In these embodiments, backup set 70 may be a point-in-time copy of less than all of information 40.

In addition to obtaining the information itself, backup server 50 can, in some embodiments, interact with backup agent 35 to obtain related partial catalog information 75 that describes the information in backup set 70. Partial catalog information 75 is information that can later be used (e.g., by copying and/or processing the partial catalog information) to generate a catalog (labeled final catalog information 80) of the information in backup set 70. In some embodiments, some portions of final catalog information 80 can also be generated directly from information included in backup set 70. Partial catalog information 75 and final catalog information 80 can be stored in catalog storage 85, which is a storage device accessible to backup server 50.

Partial catalog information 75 and backup set 70 are obtained by backup server 50 during a backup window. The backup window begins when backup server 50 begins communicating with backup agent 35 in order to obtain the desired point-in-time copy. The backup window ends when the desired point-in-time copy has been stored on backup storage 60 as backup set 70 and backup server 50 ceases communicating with backup agent 35. During the backup window, the performance of applications on computing device 10 (referred to as the host computing device, since computing device 10 hosts the server whose data is being backed up) may be negatively impacted.

In some embodiments, the backup window begins when backup server 50 initiates one or more communication channels to backup agent 35 (e.g., using a protocol such as network data management protocol (NDMP)). During the backup window, backup agent 35 and backup server 50 interact (e.g., by exchanging commands and responses to those commands) to cause a point-in-time copy of information 40 to be transferred to backup storage 60 and stored as backup set 70 via a data communication channel. Partial catalog information 75 associated with the copy of information 40 can be transferred to backup storage 60 via a control communication channel.

In some embodiments, the partial catalog information can be obtained by backup agent 35 accessing application storage 45, querying server 30, and/or processing information 40 stored on application storage 45. For example, during an NDMP backup window, backup agent 35 can access a list of inodes maintained by a file system on application storage 45. The inodes describe the files and directories stored on storage 45. The information in the inodes can be transferred to catalog storage 65 for storage as partial catalog information 75. Similarly, during an application-specific backup, in which information specific to a particular server is copied to backup, backup agent 35 can obtain information (e.g., such as filenames) of the files being copied to backup. For example, if information used by an email server is being backed up, backup agent 35 can obtain the names of the email server's database and log files and provide those to backup server 50 for storage as partial catalog information 75.

After partial catalog information 75 and backup set 70 have been stored on catalog storage 85 and backup storage 60 respectively and the backup window has closed, backup server 50 can process partial catalog information 75 and/or backup set 70 to generate final catalog information 80, which describes the contents (e.g., in terms of logical objects such as volumes, files, databases, and database components) of backup set 70. Examples of how this information can be processed are provided in the discussions of FIGS. 3-5 below.

Final catalog information 80 can identify the logical objects stored within one or more backup sets. Final catalog information 80 can also include mapping information identifying the location, within a backup set, of each identified logical object. Thus, final catalog information 80 provides information that allows a user to see what logical objects are included within each backup set, as well as mapping information that allows backup server 50 to restore a single logical object from a given backup set, without needing to restore the entire backup set.

By waiting until the closure of the backup window to complete generation of final catalog information 80, backup server 50 can decrease the length of the backup window. For example, instead of requiring the control communication channel to remain open while backup server 50 processes partial catalog information 75 identifying files and directories within a file system, at least some of this processing can be delayed until after the control communication channel has been closed. Similarly, instead of having backup agent 35 query server 30 for information identifying each logical object stored within information 40 during the backup window, backup server 50 can instead wait until after the backup window has closed to begin processing backup set 70 and/or associated partial catalog information 75 to obtain the information identifying the logical objects in backup set 70.

In many embodiments, a backup administrator will configure backup window policies that define a time period in which the backup window can occur. For example, a backup administrator can configure backup server 50 to only perform backups between 1 AM and 5 AM each day. Accordingly, no backup window in which backup server 50 is performing a backup should occur outside of the specified time period. Backup server 50 may be configured to back up many different systems (in addition to the single host shown in FIG. 1), and all backup windows should occur during the specified time period.

When a time period has been defined for backup windows, backup server 50 will not begin generating final catalog information 80 for any backup set until all scheduled backup windows are closed. Accordingly, if multiple backup windows are needed to perform scheduled backup operations, each of which generates its own backup set, backup server 50 will not begin generating final catalog information for any of the backup sets until all of the backup sets have been obtained and the corresponding backup windows have closed.

In some embodiments, in order to ensure that catalog generation does not interfere with any backup windows, a backup administrator can configure catalog window policies that define a time period in which the backup server can perform catalog generation. For example, the backup administrator can configure backup server 50 to only perform catalog generation operations (e.g., to generate final catalog information 80 from backup set 70 and/or partial catalog information 75, if any) between 7 AM and 5 PM each day. If the backup policies specify that backup windows must end at 5 AM each day, the backup administrator can be confident that the catalog generation is completely decoupled from the backup window(s), such that catalog generation will not increase the length of the backup window(s).

Since the final catalog information is not completely generated during the backup window, and may actually be generated significantly after closure of the backup window (e.g., if a catalog window policy has been specified to define a catalog window), situations may arise in which a user attempts to access the backup catalog after the backup window has closed but before backup server 50 has finished generating the backup catalog. In particular, a user may attempt to access a portion of the catalog that has not yet been generated (e.g., if the catalog displays the files within a file system, the catalog may not yet have been updated to identify all the files and/or all the relationships between all of the directories and files). In these situations, backup server 50 dynamically generates the requested portion of the backup catalog in response to the user's request. Since the requested portion of the backup catalog is being generated dynamically, in response to a user request, there may be a slight delay between the time that the user requests access to the portion of the catalog and the time at which the requested portion of the catalog is displayed to the user. In some embodiments, partial catalog information (e.g., identifying some, but not all, of the logical objects in the backup, or identifying all of the logical objects but omitting at least some of the relationships between those logical objects) can be displayed to the user while the requested information is being dynamically generated.

As noted above, application storage 45, backup storage 60, and catalog storage 85 are storage devices. These storage devices can be logical storage devices, such as volumes, or physical storage devices, such as solid state memory (e.g., Flash memory devices), magnetic storage (e.g., hard disks or tapes), and/or optical storage (e.g., digital versatile discs (DVDs) and/or compact discs (CDs)), or groups of multiple such storage devices (e.g., optical storage jukeboxes, tape libraries, hard disk arrays such as just a bunch of disks (JBOD) arrays or redundant array of independent disks (RAID) arrays, and the like). If application storage 45, catalog storage 85, and/or backup storage 60 are logical storage devices, those logical storage devices can in turn be implemented on underlying physical storage devices.

Figure 2:
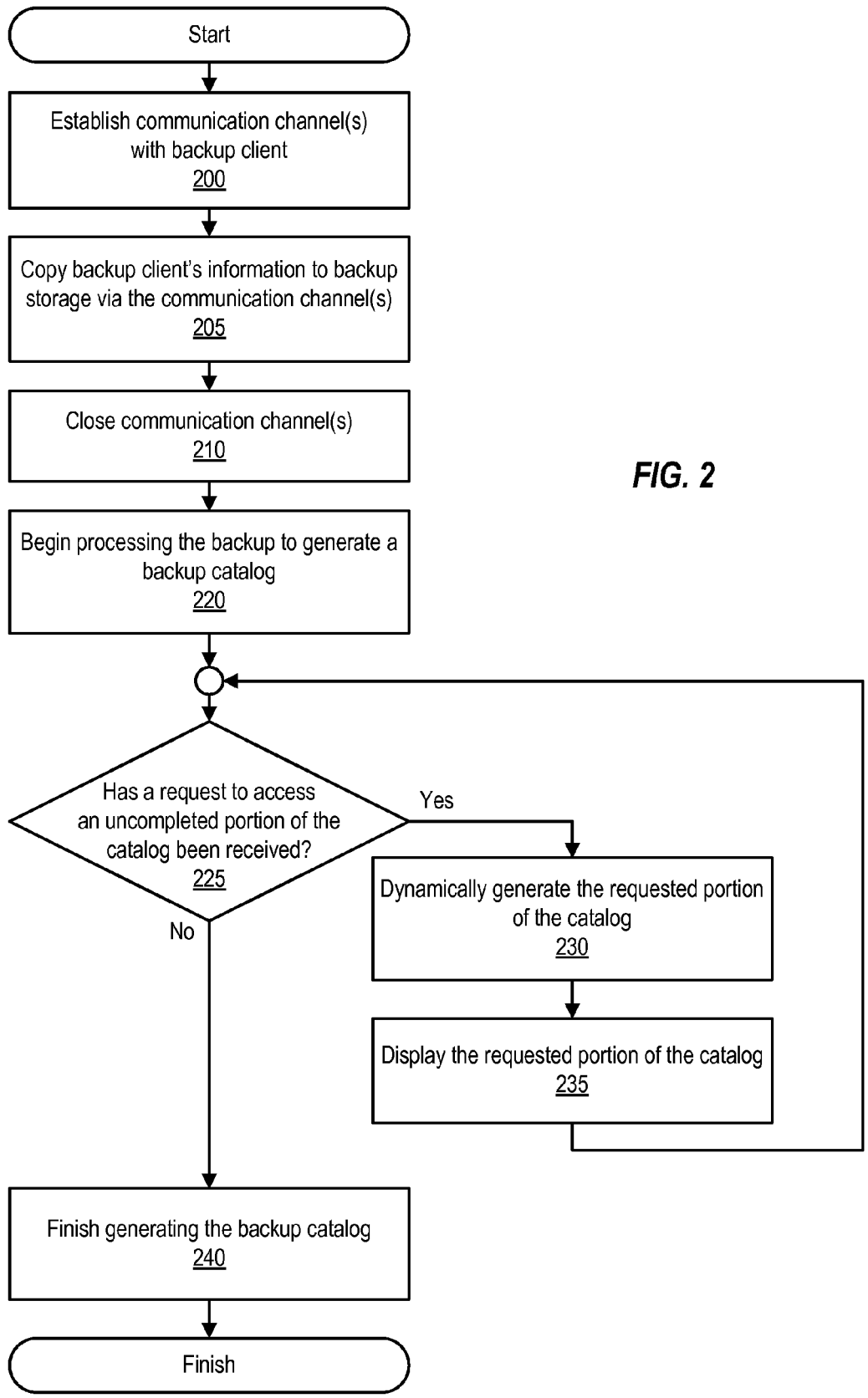
FIG. 2 is a flowchart of a method of generating a backup that uses an off-host process to generate the catalog corresponding to the backup, according to one embodiment of the present invention.

FIG. 2 is a flowchart of a method of generating a backup that uses an off-host process to generate the catalog corresponding to the backup. This method can be performed by a backup server, such as backup server 50 of FIG. 1.

In this example, the method begins at 200, when one or more communication channels are established with a backup client. The backup client is a host computing device (e.g., host computing device 10 of FIG. 1) that implements a server (e.g., server 30 of FIG. 1) whose data is being backed up. Establishment of a communication channel can involve sending one or more messages to the backup client. These messages can comply with a communication protocol, such as NDMP, that defines multiple communication channels. Alternatively, such messages can simply request specific information from the backup client. These messages can be sent to a backup agent executing on the backup client.

At 205, all or part of the information maintained by the backup client is copied to backup storage via the communication channel established at 200. This information can include an application-specific file, which is specific to a server executing on the backup client and which is usable to locate individual data objects within the information being copied, can also be copied to backup storage.

In addition to copying this information, partial catalog information describing the copied information is also sent to catalog storage (not shown). For example, partial catalog information describing the name of the volume from which the information is being copied can be sent to the catalog storage. Similarly, inode information describing the files and directories within the information being copied can be sent to the backup storage. Once the desired information has been copied, the communication channel(s) established at 200 are closed. Closure of the communication channel(s) can involve sending one or more messages to the backup client requesting that established communication channels be closed. Alternatively, closure of the communication channel(s) can involve simply ceasing to send any additional messages to the backup client and/or ceasing to receive any more information from the backup client.

Performance of operations 200, 205, and 210 takes place during the backup window. The backup window is the period in which backup-related activity takes place on both a backup server and the backup client. After the backup window closes, the remaining backup-related activity takes place solely on the backup server and does not involve the backup client.

At 220, after the backup window has closed (in this example, the backup window closes when the communication channel(s) are closed at 210), the backup server can begin processing the backup (i.e., the information and/or partial catalog information obtained during the backup window) to generate a backup catalog. In some embodiments (e.g., in which backup window policies have been specified by an administrator), performance of operation 220 is delayed until the earliest time at which a catalog window is allowed to open.

Processing of the backup can involve processing information (e.g., backup set 70 of FIG. 1) and/or partial catalog information (e.g., partial catalog information 75 of FIG. 1) related to that information. Examples of the types of processing that can be performed are provided in more detail in the descriptions of FIGS. 3-5 below. In general, the processing of the backup is performed by the backup server and does not involve the backup server communicating with the host computing device.

While the backup is being processed to generate the backup catalog, a user may request access to an uncompleted portion of the backup catalog. For example, if the backup catalog identifies a volume and files stored within that volume, a user may request access to the portion of the catalog that identifies a particular directory. However, the backup server may not have finished determining which files, if any, are stored within that particular directory. Accordingly, the requested portion of the catalog is not yet available when the user's request is received. It is noted that this situation is unlikely to occur frequently, since users typically do not need to access recent backups, especially just after the backup was obtained (users are instead more likely to want access to less recent backups).

If such a request is received, as determined at 225, the backup server can dynamically generate the requested portion of the catalog (as shown at 230) and display the requested portion of the catalog to the user (as shown at 235). Dynamically generating the requested portion of the catalog can involve generating the requested catalog information in parallel with the ongoing catalog generation process. The technique used to dynamically generate the requested portion of the catalog at 230 can be the same technique used to generate the final catalog. However, since a user is likely only interested in a particular portion of the backup, only a portion of the partial catalog information and/or backup may need to be processed.

In some embodiments, dynamically generating the requested catalog information involves accessing the backup information and/or partial catalog information in read-only mode. For example, if the backup information includes a point-in-time copy of a database, the backup server can provide a user with read-only access to the copy of the database, such that the user can browse the contents of the database. The information available for the user to browse will ultimately be available as part of the backup catalog, once the catalog generation process completes.

After the entire backup has been processed, the backup server finishes generating the backup catalog, as shown at 240. Before the backup catalog is complete, one or more requests for access to the catalog may be received and handled by performing operations 225, 230, and 235.

Figure 3:
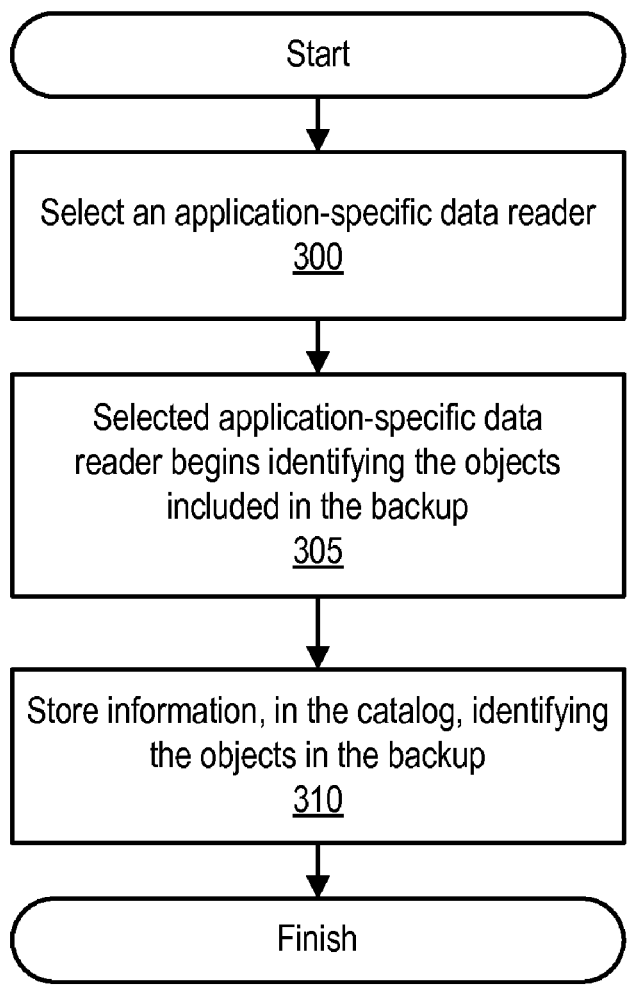
FIG. 3 is a flowchart of an off-host process for catalog generation, according to one embodiment of the present invention.

FIG. 3 is a flowchart of an off-host process for catalog generation. This technique can be used to generate catalog information for a backup that includes information maintained in a database by a server. The particular types of logical objects maintained by the server and the locations of those logical objects within the backup can be identified using a database reader that is specific to the particular server. For example, if the server is a particular type of email server, a corresponding email server database reader can be used to identify the logical objects (e.g., mailboxes, individual emails, attachments, and the like) within the backup, as well as the locations of those logical objects within the backup. The process of FIG. 3 begins after the backup window is closed, and may be delayed until a time at which is permissible to open a catalog window, if such a time has been specified.

Before the process of FIG. 3 begins, some partial catalog information may be received during the backup window. For example, an email server may store emails and other logical objects in one or more database files. Information identifying the email server that maintains the backed up information, the volume(s) on which the database files are stored, and/or the database files themselves may have been collected (e.g., by a backup agent on the host computing device) during the backup window. This information can be added to a partial catalog during the backup window.

At 300, an application-specific data reader is selected. The selected data reader is specific to the particular server whose data is included in the backup. Thus, if the server is a directory services server (e.g., such as Active Directory™), then an appropriate directory services data reader is selected. If instead the server is an email server, an appropriate email data reader is selected.

In some embodiments, selecting the application-specific data reader involves selecting an application-specific file that is included in the backup, and then using the information contained within this file to locate logical objects within the backup. For example, if the server whose data is included in the backup is a Microsoft™ Exchange email server, the corresponding application-specific file is ese.dll. Similarly, if the server is an Active Directory™ server, the corresponding application-specific file is esead.dll, and the like. Such a file allows the application-specific data reader to browse the backup and identify the logical objects included within the backup.

At 305, the selected application-specific data reader begins identifying the objects that are included in the backup. Information identifying the objects that are identified in 305 is stored in the catalog, as shown at 310. This identifying information can include an object name, access properties, ownership, size (e.g., in bytes), creation, access, and/or modification timestamps, and the like. This information also includes information identifying the location of each identified object within the backup. This location information provides enough information to be able to copy the identified object from the backup to another location (e.g., to perform a restore operation), without needing to copy any other object within the backup.

It is noted that operations 305 and 310 can be repeated iteratively, for each successive logical object within the backup. For example, each time a new object is identified at 305, information identifying that new logical object can be added to the catalog at 310, before other new objects are identified.

As noted above, before the process of FIG. 3 begins, a partial catalog can simply identify the database file(s) or volume(s) that are included in the backup. Accordingly, if a user requests to access the catalog before the process of FIG. 3 has completed, the user can view the partial catalog. If the user selects a database file within the partial catalog and the logical objects within that database file have not already been identified, the backup server can dynamically use the application-specific reader to allow the user to browse a read-only copy of that database file.

Figure 4:
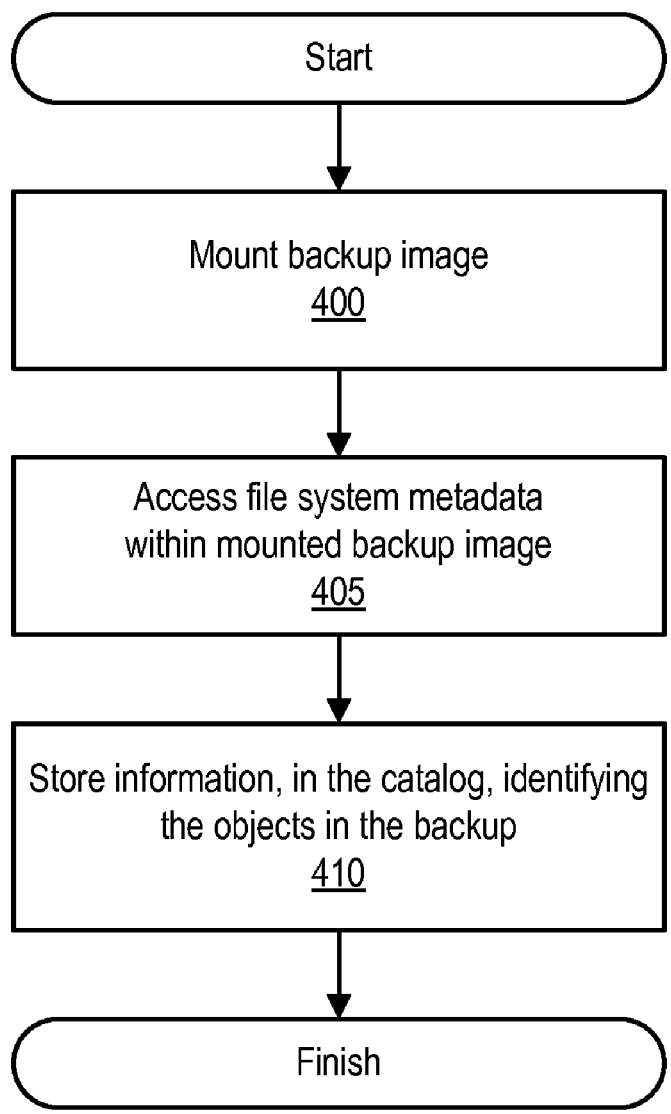
FIG. 4 is a flowchart of another off-host process for catalog generation, according to another embodiment of the present invention.

FIG. 4 is a flowchart of another off-host process for catalog generation. This process can be performed to generate a catalog for a backup that includes an image copy of a logical volume. Such backups can be generated by creating a block-level (as opposed to file level) copy of the logical volume. Like the process of FIG. 3, the process of FIG. 4 begins after the backup window is closed, and may be delayed until a time at which is permissible to open a catalog window, if such a time has been specified.

The process of FIG. 4 begins at 400, when the backup image is mounted by the backup server. Mounting the backup image allows the backup server to access the organization of files and directories within the backup image using normal file access commands.

The backup server then accesses file system metadata within the mounted backup image, as indicated at 405. The file system metadata identifies the files and directories stored within the backup image, as well as the relationships between those files and directories (e.g., by identifying which files and/or other directories are included within each directory). Based upon this information, the backup server can identify the logical objects (e.g., files and directories) within the backup image. Information identifying those logical objects and the relationships between those objects can then be stored in the catalog, as shown at 410.

In some embodiments, the file system metadata is processed by traversing the files in the file system. For example, the backup server can begin accessing a root directory within the file system, and then access each directory and file included within the root directory. As files and directories are encountered in this traversal, information identifying that file or directory, its location within the backup image, its parent directory (if any), and (for directories) any directories or files included within that directory can be added to the catalog. Information identifying a file can include information such as a file name, file size, file ownership, access privileges, creation dates, modification dates, and/or a partial catalog information identifier (e.g., an inode number) for partial catalog information associated with the file, and the like.

In other embodiments, the backup server traverses a file system metadata structure (e.g., an inode table). In these embodiments, the backup server can access file system metadata for each file and directory, and store information identifying that file or directory in the catalog. In some situations, at least some of the file system metadata structure may be processed multiple times in order to fully generate the catalog. For example, metadata associated with a file may not identify the directory (or directories) in which that file is included. Furthermore, a file's metadata may be processed prior to the partial catalog information of the directory in which that file is included. Accordingly, the hierarchical location of the file within a directory structure will not be identified until the time at which the directory's metadata is processed. Furthermore, in some file systems, the file's filename is stored as part of the metadata for the directory that includes the file but not as part of the metadata for the file itself. Accordingly, until the directory's metadata is processed, only limited information identifying the file (e.g., by identifying its metadata structure, such as an inode number) can be added to the catalog. The file's location within a directory hierarchy and/or filename may not be available until the metadata corresponding to the directory that includes that file is processed. The catalog is not complete until both the files and directories and the relationships among those files and directories are identified.

A user can request access to the catalog before it is complete. For example, when the user requests access to the catalog, some files within the backup image may have been identified and added to the catalog, but the directory hierarchy may not yet be available. In such a situation, the backup server may allow the user to browse a read-only copy of the mounted backup image.

Figure 5:
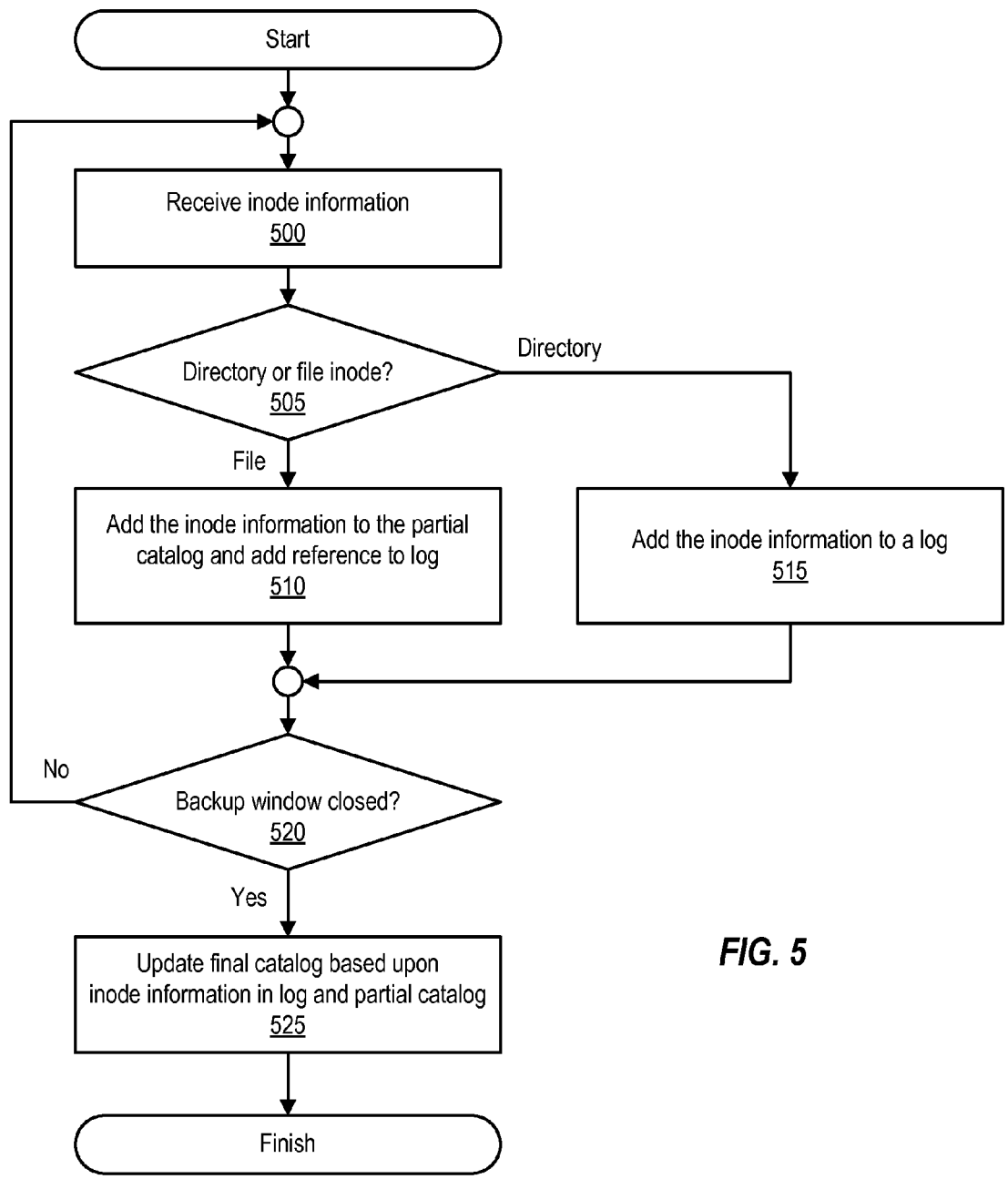
FIG. 5 is a flowchart of yet another off-host process for catalog generation, according to yet another embodiment of the present invention.

FIG. 5 is a flowchart of yet another off-host process for catalog generation. This process can be performed to generate a catalog for a backup, based upon an inode-based traversal of the file system metadata. This process can begin before closure of the backup window, but is not completed until after closure of the backup window. Completion of the catalog can be delayed until a time at which is permissible to open a catalog window, if such a time has been specified.

Each inode is a file system metadata structure that includes metadata representing a logical object (e.g., a file or directory) within a file system. Modes can be identified by numbers or other unique identifiers (for simplicity, inodes are referred to as being identified by number in the example presented herein).

An inode for a file stores information identifying the file's location within a storage device, the size of the file, the file's owner and group, the file's access permissions, the times at which the inode was created, last modified, and last accessed, and a reference count telling how many hard links point to the inode (this indicates the number of parent directories that include the corresponding file).

An inode for a directory stores information identifying each file within that directory, by both filename and inode number. Thus, the directory associates a filename with an inode number.

Certain communication protocols that can be used during the backup window, such as NDMP, allow partial catalog information to be sent to the backup server via a control communication channel, while the underlying file data is being sent to the backup server via a data communication channel. The partial catalog information can include inode information, which is information stored within an inode. The inode information can be sent in the order that the inodes are accessed on the host system. For example, the inode information can be sent in the order in which that inode information is obtained by traversing an inode table (e.g., in order of the numbers assigned to each inode).

Thus, inode information can be received by a backup server during a backup window, as shown at 500. As noted above, inode information can identify a file or a directory. The type of inode information can be determined based upon the contents of the inode information. Accordingly, for each received piece of inode information, the backup server can determine whether that inode information is information from a file inode or a directory inode, as shown at 505.

If the inode information is file inode information, the information is added to the partial catalog, as shown at 510. Additionally, a reference to (e.g., a pointer or inode number) the file inode information is added to a log. The reference can, in one embodiment, identify the file inode information and the location of that file inode information within the partial catalog. The log will be processed after the backup window closes.

In contrast, if the inode information is directory inode information, the information is stored in the log instead of the partial catalog, as shown at 515. Unlike the reference to file inode information, which does not include the entire contents of the file inode, the information added to the log for a directory inode includes the entire contents of the directory inode. In some embodiments, a simple entry identifying the directory can be added to the partial catalog as part of operation 515; however, this simple entry will simply identify the directory (e.g., by inode number) and will not identify any relationships between the directory and any other logical objects.

Operations 500, 505, 510, and/or 515 can repeat until the backup window closes, as indicated at 520. At the time that the backup window has closed, the partial catalog stores information identifying (e.g., by inode number, if filenames are not available in the file inode information) each file within the backup, but does not store information identifying directories and the hierarchical relationships between files and directories. The partial catalog may also lack filename information for the identified files.

After the backup window has closed (and a catalog window has opened, if a time period in which catalog windows can occur has been defined), the backup server can transform the partial catalog into the final catalog, based upon the log. The backup server can copy the partial catalog into the final catalog, and then begin modifying the final catalog in response to the contents of the log.

The backup server begins updating the final catalog, as shown at 525, based upon the inode information that was stored in the log at 515. In one embodiment, the initial version of the partial catalog (which lacks hierarchical relationships and other information) is stored in one file; a different file is used to store the log. Yet another file can store the final version of the catalog, which includes the initial version of the catalog and updates obtained from the log.

To update the final catalog, the backup server can process each piece of inode information included in the log. The directory inode information identifies the file(s) and directory or directories included within a corresponding directory. Accordingly, each time a piece of directory inode information is processed, information identifying the corresponding directory can be added to the final catalog (e.g., by adding a catalog entry corresponding to the directory, if such an entry was not added at 515). Information relating the corresponding directory to the file(s) and/or directory or directories included within the corresponding directory can also be added to the final catalog (e.g., by updating the catalog entry for the corresponding directory as well as any catalog entries that correspond to the logical objects within the corresponding directory to indicate appropriate parent and/or child relationships within the hierarchical directory structure). Finally, if the directory inode information is the source of filenames for the logical objects included within the corresponding directory, this information can be added to the final catalog as well (e.g., by updating the catalog entries corresponding to the named logical objects). The references to file inode information in the log can be used to locate file inode information within the catalog, as needed.

After the log has been processed, the final catalog now identifies all of the logical objects within the backup, as well as the hierarchical relationships between those objects. If a user requests access to the catalog prior to completion of processing of the log, the backup server can dynamically generate the requested portions of the catalog (e.g., by processing a read-only copy of the log and/or partial catalog).

While the above description of FIG. 5 describes a scenario in which a partial catalog is created during the backup window, other scenarios are possible. For example, in an alternative embodiment, the inode information is obtained after the backup window has closed (e.g., as described above with respect to FIG. 4).

Figure 6:
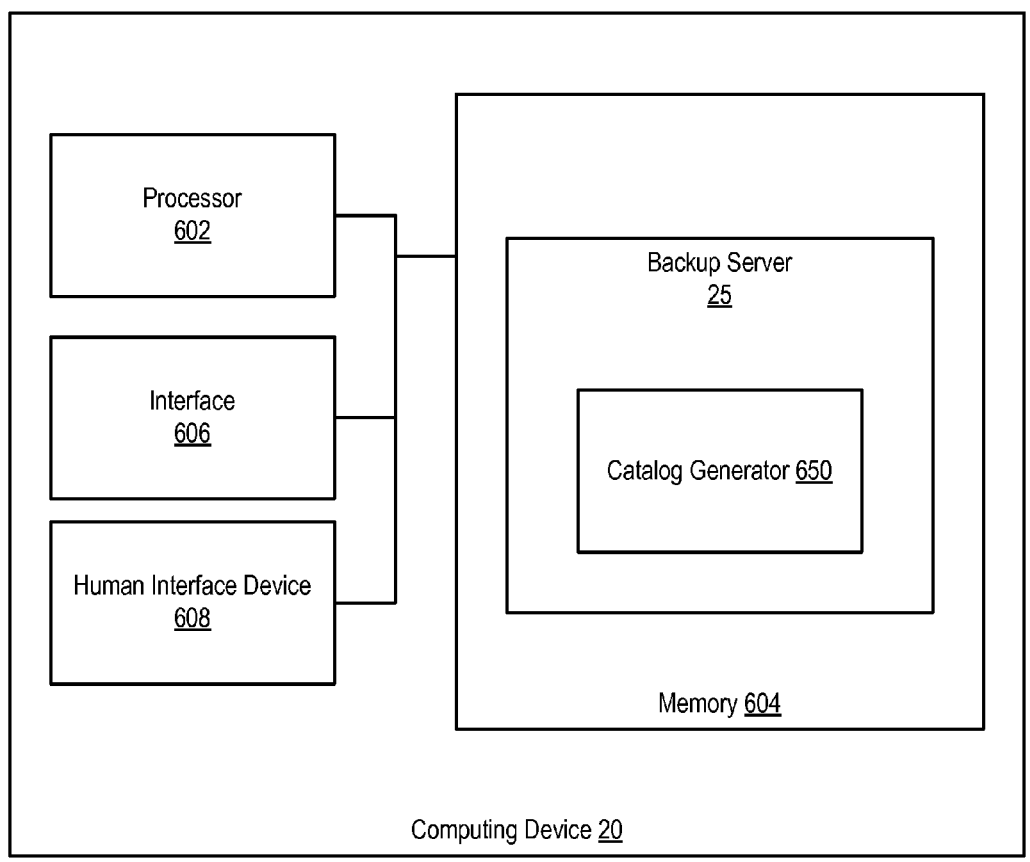
FIG. 6 is a block diagram of a computing device, illustrating how a backup server can be implemented in software, according to one embodiment of the present invention.

FIG. 6 is a block diagram of a computing device 20, illustrating how a backup server 50 (e.g., backup server 50 of FIG. 1) can be implemented in software. By executing the software that implements backup server 50, computing device 20 becomes a special purpose computing device that is configured to perform off-host cataloging of a backup, which generates information identifying the logical objects within a backup, subsequent to closure of the backup window in which the backup was generated.

Computing device 20 can be a personal computer, network appliance, server, personal digital assistant, mobile phone, storage controller (e.g., an array controller, tape drive controller, or hard drive controller), laptop computer, or the like. In general, computing device 20 is configured to execute software or otherwise provide appropriate functionality to act as a component of the system described herein.

As illustrated, computing device 20 includes one or more processors 602 (e.g., microprocessors, programmable logic devices (PLDs), or application specific integrated circuits (ASICs)) configured to execute program instructions stored in memory 604. Memory 604 can include various types of RAM, Read Only Memory (ROM), Flash memory, micro electro-mechanical systems (MEMS) memory, magnetic core memory, and the like. Memory 604 can include both volatile and non-volatile memory. Computing device 20 also includes one or more interfaces 606. Processor 602, interface 606, and memory 604 are coupled to send and receive data and control signals by a bus or other interconnect.

Interface 606 can include a network interface to various networks (e.g., such as network 55 of FIG. 1) and/or interfaces to various peripheral buses. For example, interface 606 can include a network interface (e.g., implemented as a network interface card) via which messages generated by backup server 50 can be sent to other devices (e.g., such as a host computing device like computing device 10 of FIG. 1) in order to, for example, open or close a backup window. Interface 606 can also include an interface to one or more storage devices (e.g., on which the backup, the catalog, and/or other partial catalog information used to generate the final catalog is stored).

In this example, program instructions and data executable to implement all or part of backup server 50 are stored in memory 604. Backup server 50 includes a catalog generator 650, which is configured to perform off-host processing (e.g., using a process similar to one of the processes shown in FIGS. 3-5) in order to generate a catalog for a backup, subsequent to closure of a backup window used to obtain the backup. The process of generating a catalog for a particular backup set transforms partial catalog information associated with the backup set and/or included the backup set itself into a catalog that describes the contents of the backup set. Catalog generator 650 is further configured to dynamically generate at least a portion of the catalog, in response to a user requesting access to the catalog before the catalog has been completely generated.

Human user interface 608 can include one or more of a variety of different human user input and/or output devices, and/or one or more interfaces to such input and/or output devices. Such input and/or output devices can include monitors or other displays, keyboards, keypads, mice, electronic tablets, touch screens, audio speakers, and the like. Input (e.g., requesting access to a backup catalog) to and output from (e.g., the catalog) backup server 50 can be received and/or sent via such an input and/or output device.

The program instructions and data implementing backup server 50 can be stored on various computer readable storage media such as memory 604. In some embodiments, such software is stored on a computer readable storage medium such as a compact disc (CD), digital versatile disc (DVD), hard disk, optical disk, tape device, floppy disk, and the like). In order to be executed by processor 602, the instructions and data can be loaded into memory 604 from the other computer readable storage medium. The instructions and/or data can also be transferred to computing device 20 for storage in memory 604 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    initiating, subsequent to closure of a backup window, generation of at least a portion of a catalog, wherein the catalog identifies contents of a set of backup information received during the backup window, and wherein the generation of the at least the portion of the catalog is performed by a backup computing device;
    receiving, from a user, a request to access the catalog, prior to completion of generation of the at least the portion of the catalog, wherein the request to access the catalog requests access to a portion of the catalog that has not yet been generated at the time that the request is received;
    dynamically generating the portion of the catalog requested by the user; and
    displaying, to the user, information included in the catalog, in response to receipt of the request.

2. The method of claim 1, wherein the dynamically generating the portion of the catalog comprises accessing a partial catalog that has already been generated.

3. The method of claim 2, wherein the partial catalog is received from a host computing device during the backup window.

4. The method of claim 1, wherein the set of backup information includes a volume image, and wherein the generation of the at least the portion of the catalog comprises mounting the volume image and then accessing file system metadata within the volume image.

5. The method of claim 1, wherein the set of backup information includes an application-specific file and a copy of at least a portion of a database used by an application, and wherein the generation of the at least the portion of the catalog comprises using the application-specific file to identify logical objects within the copy of the at least the portion of the database.

6. The method of claim 1, further comprising:
    receiving a plurality of pieces of inode information during the backup window, wherein the inode information includes directory inode information and file inode information;
    storing the file inode information in the catalog and adding a reference to the file inode information in a log; and
    storing the directory inode information in the log, wherein the generation of the at least the portion of the catalog comprises processing the log, in response to closure of the backup window.

7. The method of claim 6, wherein the processing the log comprises:
    identifying, for each piece of directory inode information stored in the log, a relationship with one or more of the pieces of inode information; and
    storing information indicating the relationship in the catalog.

8. The method of claim 1, wherein the initiating, subsequent to closure of a backup window, generation of the at least the portion of the catalog, is delayed until a catalog window opens.

9. A computer readable storage medium storing program instructions executable by one or more processors to implement a backup module, wherein the backup module is configured to:
    initiate, subsequent to closure of a backup window, generation of at least a portion of a catalog, wherein the catalog identifies contents of a set of backup information received during the backup window;
    receive, from a user, a request to access the catalog of the contents of the set of backup information, prior to completion of generation of the at least the portion of the catalog, wherein the request to access the catalog requests access to a portion of the catalog that has not yet been generated at the time that the request is received;
    dynamically generate the portion of the catalog requested by the user; and
    cause to be displayed, to the user, information included in the catalog of the contents of the backup image, in response to receipt of the request.

10. The computer readable storage medium of claim 9, wherein the set of backup information includes a volume image, and wherein the backup module is configured to mount the volume image and then access file system metadata within the volume image.

11. The computer readable storage medium of claim 9, wherein the set of backup information includes an application-specific file and a copy of at least a portion of a database used by an application, and wherein the backup module is configured to use the application-specific file to identify logical objects within the copy of the at least the portion of the database.

12. The computer readable storage medium of claim 9, wherein the backup module is further configured to:
    receive a plurality of pieces of inode information during the backup window, wherein the inode information includes directory inode information and file inode information;
    store the file inode information in the catalog and add a reference to the file inode information in a log; and
    store the directory inode information in the log, wherein the generation of the at least the portion of the catalog comprises processing the log, in response to closure of the backup window.

13. The computer readable storage medium of claim 12, wherein the backup module is configured to:
    identify, for each piece of directory inode information stored in the log, a relationship with one or more of the pieces of inode information; and
    store information indicating the relationship in the catalog.

14. A system, comprising:
    one or more processors; and
    a memory coupled to the one or more processors, the memory storing program instructions executable by the one or more processors to implement a backup module, wherein the backup module is configured to:
        initiate, subsequent to closure of a backup window, generation of at least a portion of a catalog, wherein the catalog identifies contents of a set of backup information received during the backup window;
        receive, from a user, a request to access the catalog of the contents of the set of backup information, prior to completion of generation of the at least the portion of the catalog, wherein the request to access the catalog requests access to a portion of the catalog that has not yet been generated at the time that the request is received;
        dynamically generate the portion of the catalog requested by the user; and cause to be displayed, to the user, information included in the catalog of the contents of the backup image, in response to receipt of the request.

15. The system of claim 14, wherein the backup module is further configured to:
receive a plurality of pieces of inode information during the backup window, wherein the inode information include directory inode information and file inode information;
store the file inode information in the catalog and add a reference to the file inode information in a log; and
store the directory inode information in the log, wherein the generation of the at least the portion of the catalog comprises processing the log, in response to closure of the backup window.

16. The system of claim 15, wherein the backup module is configured to:
identify, for each piece of directory inode information stored in the log, a relationship with one or more of the pieces of inode information; and
store information indicating the relationship in the catalog.

17. The system of claim 14, wherein the backup module is configured to delay generation of the at least the portion of the catalog until a catalog window opens.

* * * * *